(12) United States Patent
Hansen et al.

(10) Patent No.: US 8,565,052 B2
(45) Date of Patent: Oct. 22, 2013

(54) METHODS, SYSTEMS, AND COMPUTER PROGRAM PRODUCTS FOR CORRECTING REPEATABLE RUNOUT

(75) Inventors: Fred R. Hansen, Boulder, CO (US); Charles R. Watt, Longmont, CO (US)

(73) Assignee: Optical Devices, LLC, Portsmouth, NH (US)

( * ) Notice: Subject to any disclaimer, the term of this patent is extended or adjusted under 35 U.S.C. 154(b) by 0 days.

(21) Appl. No.: 13/528,760

(22) Filed: Jun. 20, 2012

(65) Prior Publication Data

US 2012/0320720 A1 Dec. 20, 2012

Related U.S. Application Data

(60) Provisional application No. 61/498,781, filed on Jun. 20, 2011, provisional application No. 61/498,792, filed on Jun. 20, 2011.

(51) Int. Cl.
   *G11B 7/00* (2006.01)
(52) U.S. Cl.
   USPC .................................................... 369/44.32
(58) Field of Classification Search
   None
   See application file for complete search history.

(56) References Cited

U.S. PATENT DOCUMENTS

| | | | |
|---|---|---|---|
| 5,204,793 A | 4/1993 | Plonczak | |
| 5,550,685 A | 8/1996 | Drouin | |
| 5,854,722 A | 12/1998 | Cunningham et al. | |
| 5,920,441 A | 7/1999 | Cunningham et al. | |
| 6,061,200 A * | 5/2000 | Shepherd et al. | 360/77.04 |
| 6,765,848 B2 | 7/2004 | Faucett | |
| 6,987,638 B1 | 1/2006 | Brunnett et al. | |
| 7,085,094 B1 | 8/2006 | Heimbaugh et al. | |
| 7,333,410 B2 | 2/2008 | Serrano | |
| 7,443,148 B2 | 10/2008 | Weng | |
| 7,580,217 B2 | 8/2009 | Abe et al. | |
| 7,903,367 B2 | 3/2011 | Shelton | |
| 2003/0016607 A1* | 1/2003 | Cho et al. | 369/47.42 |
| 2011/0213507 A1 | 9/2011 | Dooley | |

FOREIGN PATENT DOCUMENTS

| | | |
|---|---|---|
| GB | 1300755 | 12/1972 |
| JP | 55025121 | 2/1980 |
| JP | 57052901 | 3/1982 |
| WO | WO 01/44681 | 6/2001 |

* cited by examiner

*Primary Examiner* — Wayne Young
*Assistant Examiner* — Brian Butcher

(57) ABSTRACT

Methods and systems are described for correcting repeatable runout. In one aspect, an open loop tracking signal is received and squared. A discrete Fourier transform (DFT) of the squared open loop tracking signal is obtained. A velocity magnitude and an absolute value of the phase of the open loop tracking signal is determined. A RRO correction signal is iteratively constructed by performing a partial correction based on an initial phase selected and an initial velocity amplitude, measuring a relative velocity amplitude, performing a partial control correction using the initial phase and relative velocity amplitude if the amplitude is smaller than an initial amplitude or using the initial phase rotated by one hundred eighty degrees and the relative velocity amplitude if the amplitude is larger than an initial amplitude, and repeating the above steps until a tracking controller can perform closed loop control of the track to optical pickup unit velocity.

24 Claims, 7 Drawing Sheets

METHODS, SYSTEMS, AND COMPUTER PROGRAM PRODUCTS FOR CORRECTING REPEATABLE RUNOUT

RELATED APPLICATIONS

This application claims the benefit of U.S. Provisional Patent No. 61/498,781, titled "Digital Augmentation for an Analog Controller", filed on Jun. 20, 2011 and U.S. Provisional Patent No. 61/498,792, titled "Open Loop Repeatable Runout Correction", filed on Jun. 20, 2011, the entire disclosures of which are hereby incorporated by reference.

BACKGROUND

A significant problem in both disk drives and testers such as optical drives, CD drives, etc. is repeatable run out (RRO) of the tracks. The primary source of the RRO is the hole in the disk being mis-centered with respect to the spiral tracks. This mis-centering causes a sinusoidal movement of the tracks at the spin frequency. In addition, if the disk is not perfectly round, this can cause RRO at multiples of the spin frequency.

One possible way to deal with the RRO is to close the tracking loop and "learn" the repeatable control signal needed to cancel the repeatable portion of the observed tracking error. This approach requires that the tracking loop be closed without benefit of the cancelling control signal. If the RRO is not too large, this approach works extremely well. However, if the disk has a badly miscentered hole or the spin rate is very high then it can be impossible to close the tracking loop in the first place.

Accordingly, there exists a need for methods, systems, and computer program products for correcting repeatable runout.

SUMMARY

Methods and systems are described for correcting repeatable runout. In one aspect, an open loop tracking signal is received and squared. A discrete Fourier transform (DFT) of the squared open loop tracking signal is obtained. A velocity magnitude and an absolute value of the phase of the open loop tracking signal is determined. A RRO correction signal is iteratively constructed by performing a partial correction based on the initial phase selected and an initial velocity amplitude; measuring a relative velocity amplitude, performing a partial control correction using the initial phase and relative velocity amplitude if the amplitude is smaller than an initial amplitude; performing a partial control correction using the initial phase and the relative velocity amplitude if the amplitude is smaller than an initial amplitude, and repeating the above steps until a tracking controller can perform closed loop control of the track to optical pickup unit velocity.

In another aspect, a tracking loop is closed at an initial spin frequency lower than the actuator resonance frequency using a disk with a mis-centered spindle access hole. A phase and amplitude of a cancellation signal is determined from the tracking loop at the initial spin frequency. The spin frequency is increased to an end frequency past the actuator resonance frequency at a rate such that the tracking loop remains closed. A change in phase and amplitude of the cancellation signal is determined as the spin frequency is increased. An actuator response is mapped from the initial spin frequency to the end spin frequency based on the phase and amplitude of the cancellation signal and the change in phase and amplitude of the cancellation signal.

BRIEF DESCRIPTION OF THE DRAWINGS

Advantages of the claimed invention will become apparent to those skilled in the art upon reading this description in conjunction with the accompanying drawings, in which like reference numerals have been used to designate like or analogous elements, and in which:

DETAILED DESCRIPTION

Figure 1:
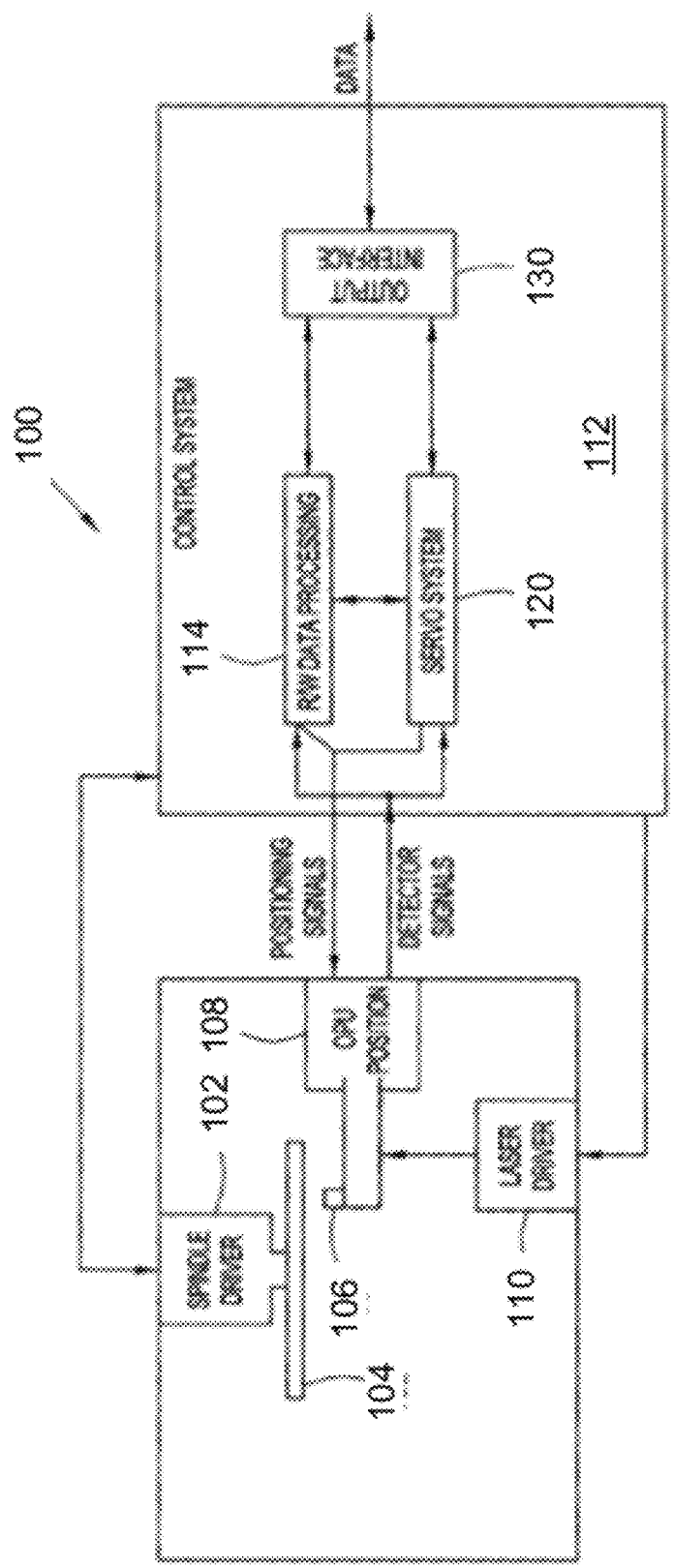
FIG. 1 is a block diagram illustrating an exemplary hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes an optical drive 100. Other types of drives may be used. Optical drive 100 includes a spindle motor 102 on which an optical media 104 is mounted. Optical drive 100 further includes an optical pick-up unit (OPU) 106 mechanically controlled by an actuator arm 108. OPU 106 includes a light source electrically controlled by laser driver 110. OPU 106 further includes optical detectors providing signals for controller 112. Controller 112 can control the rotational speed of optical media 104 by controlling spindle motor 102, control the position and orientation of OPU 106 through actuator arm 108, and control the optical power of the light source in OPU 106 by controlling laser driver 110.

Controller 112 includes read/write (R/W) processing 114, servo system 120, and interface 130. R/W processing 114 controls the reading of data from optical media 104 and the writing of data to optical media 104. R/W processing 114 outputs data to a host (not shown) through interface 130. Servo system 120 controls the speed of spindle motor 102, the position of OPU 106, and the laser power in response to signals from R/W processing 114. Further, servo system 120 insures that the operating parameters (e.g., focus, tracking, spindle motor speed and laser power) are controlled in order that data can be read from or written to optical media 104. Further details on the exemplary system of FIG. 1 is described in U.S. Pat. No. 6,898,164 for "Close Tracking Algorithm in a Digital Tracking Servo System", herein incorporated by reference in its entirety.

Figure 2:
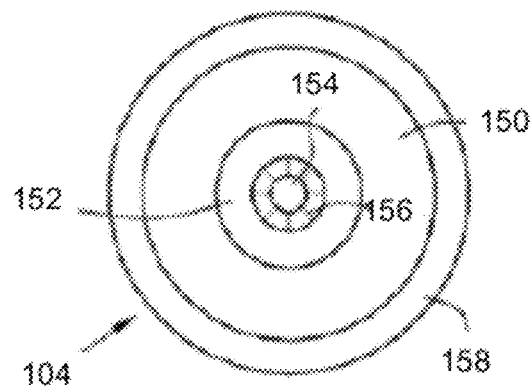
FIG. 2 is an illustration of an optical media.

FIG. 2 shows an example of optical media 104. Optical media 104 can include any combinations of pre-mastered portions 150 and writeable portions 152. Premastered portions 150, for example, can be written at the time of manufacture to include content provided by a content provider. The content, for example, can include audio data, video data, text data, or any other data that can be provided with optical media 104. Writeable portion 152 of optical media 104 can be written onto by drive 100 to provide data for future utilization of optical media 104. The user, for example, may write notes, keep interactive status (e.g. for games or interactive books) or other information on the disk. Drive 100, for example, may write calibration data or other operating data to the disk for future operations of drive 100 with optical media 104. In some embodiments, optical media 104 includes an inner region 156 close to spindle access 154. A bar code can be written on a portion of an inner region 156. The readable portion of optical media 104 starts at the boundary of region 152 in FIG. 1B. In some embodiments, writeable portion 152 may be at the outer diameter rather than the inner diameter. In some embodiments of optical media 104, an unusable outer region 158 can also be included.

An example of optical media 104 is described in U.S. application Ser. No. 09/560,781 for "Miniature Optical Disk For Data Storage", herein incorporated by reference in its entirety. The RAN Data Processing 114 can operate with many different disk formats. One example of a disk format is provided in U.S. Pat. No. 6,580,683, for "Optical Recording Medium Having a Mastered Data Area and a Writeable Data Area," herein incorporated by reference in its entirety. Other examples of disk data formats are provided in U.S. Pat. No. 6,823,398, "File System Management Embedded in a Storage Device;" U.S. Pat. No. 6,738,333, "Format for Recording Data in a Storage Disk;" U.S. application Ser. No. 09/542,181, "Structure and Method for Storing Data on Optical Disks;" U.S. Pat. No. 6,636,966 for "Digital Rights Management Within an Embedded Storage Device;" U.S. Pat. No. 7,051,054 for "Method and Apparatus for Emulating Read/Write File System on a Write-Once Storage Disk;" and U.S. application Ser. No. 09/583,452 for "Method of Decrypting Data Stored on a Storage Device Using an Embedded Encryption/Decryption Means," each of which is herein incorporated by reference in its entirety.

Drive 100 can be included in any host, for example personal electronic devices. Examples of hosts that may include drive 100 are further described in U.S. patent application Ser. No. 09/315,398 for Removable Optical Storage Device and System, herein incorporated by reference in its entirety. Further discussions of hosts that may include drive 100 is provided in U.S. Pat. Nos. 6,809,995 and 6,847,597 each of which is herein incorporated by reference in its entirety. In some embodiments It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

Figure 11:
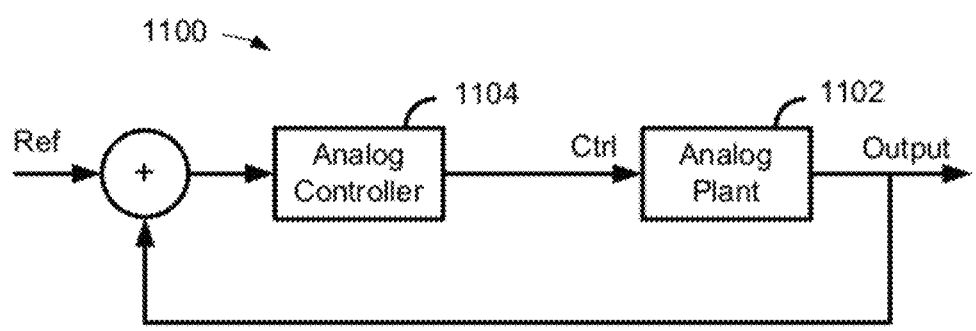
FIG. 11 is a block diagram illustrating an arrangement of components of an analog control loop.

Conventional optical drive servo systems are analog servos. FIG. 11 illustrates a simple analog controller 1100. The analog plant 1102 consists of either the tracking or focus voice control motor (VCM), the optical pick-up unit (OPU) and the respective tracking error signal/focus error signal circuitry. The input control signal to the analog plant 1102 is the current to drive the tracking/focus VCM and the output is the respective tracking error signal or focus error signal.

The output of the analog plant 1102 is subtracted from a reference signal to produce an analog error signal. The analog error signal is input to the analog controller 1104, which produces the control signal to drive the analog plant 1102.

An analog design has several advantages. The analog circuits respond to the errors as fast as is possible given the dynamic constraints of the controller design. This leads to a minimum possible phase loss in the controller. Phase is an important consideration because greater phase loss results in poorer response in the loop to disturbances or changes in the reference signal.

An analog control architecture also has several limitations. The control system is generally implemented as a linear dynamic system using linear circuit components. As such, it is difficult to implement non-linear or time varying control algorithms. An example of a non-linear control algorithm would be an anti-windup circuit for integrators. An example of time varying control would be to change control algorithms (either gains or the entire control structure) depending on the current conditions, such as during error recovery or for seeks and track jumps on an optical disk tester or player. All of this can be relatively simple to implement using a digital controller, but can be very problematic using an analog controller.

Figure 12:
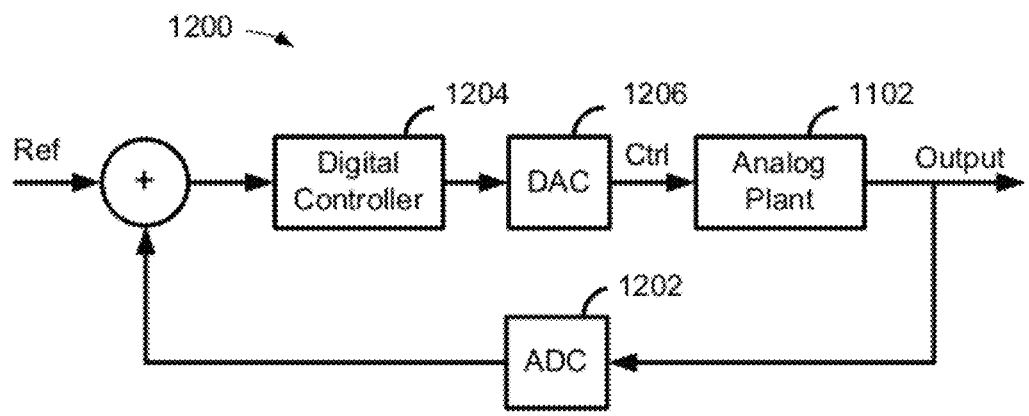
FIG. 12 is a block diagram illustrating an arrangement of components for a digital control loop.

Turning now to FIG. 12, the basic architecture of a digital control loop 1200 is shown. The output of the analog plant 1102 is sampled using an analog to digital converter (ADC) 1202 which generally samples at a regular sample rate. These values are read by a microprocessor which implements the digital control algorithm in the digital controller 1204. The microprocessor writes the resulting control values to a digital to analog converter (DAC) 1206, which provides the analog control signal needed to drive the analog plant.

Using a digital control architecture has several advantages over an analog system. It is much easier to implement non-linear or time varying control algorithms. Since the control algorithm itself is implemented as a program in a microprocessor, the designer has a significant amount of freedom in designing the control algorithm. Non-linear elements such as limiters in an integrator block are easy to implement in a computer program. If needed, the gains in the control system can be changed based on the immediate conditions in the loop (for example larger gains for larger errors). The entire structure of the control can be changed when needed (for example using a different controller for track jumps or seeks in an optical or DVD or CD and the like tester or player).

Another major advantage of digital controllers is that the input signal can be much more flexible than for a standard analog system. The sample data can be put through non-linear maps to correct for known signal distortions. In some case, the true error signal can be constructed rather than measured. For example, digital controllers often handle signal drop out by using a prediction of the desired signal.

However, there are disadvantages to using a digital controller. The primary disadvantage is the extra phase loss inherent in a digital controller. The controller has information only as recent as the last ADC sample. This imposes an average delay in responding to disturbances of at least ½ of the ADC sample time. In addition, any time spent processing the data in the microprocessor adds the time delay. This time delay adds directly to the phase loss in the overall control loop.

Another disadvantage is that it is impossible to exactly mimic a linear analog controller using a digital implementation. One problem is the additional phase loss described above due to the ADC sample time. Another is that that the digital controller cannot sense signal changes that occur at a frequency more than ½ the sample rate of the ADC. This is the Nyquist limit and imposes a fundamental limitation on the type of frequency response that can be obtained with a digital controller. A digital controller cannot implement some control loops such as, for example, specification compliant focus and tracking loops needed for some types of disk testers.

Figure 3:
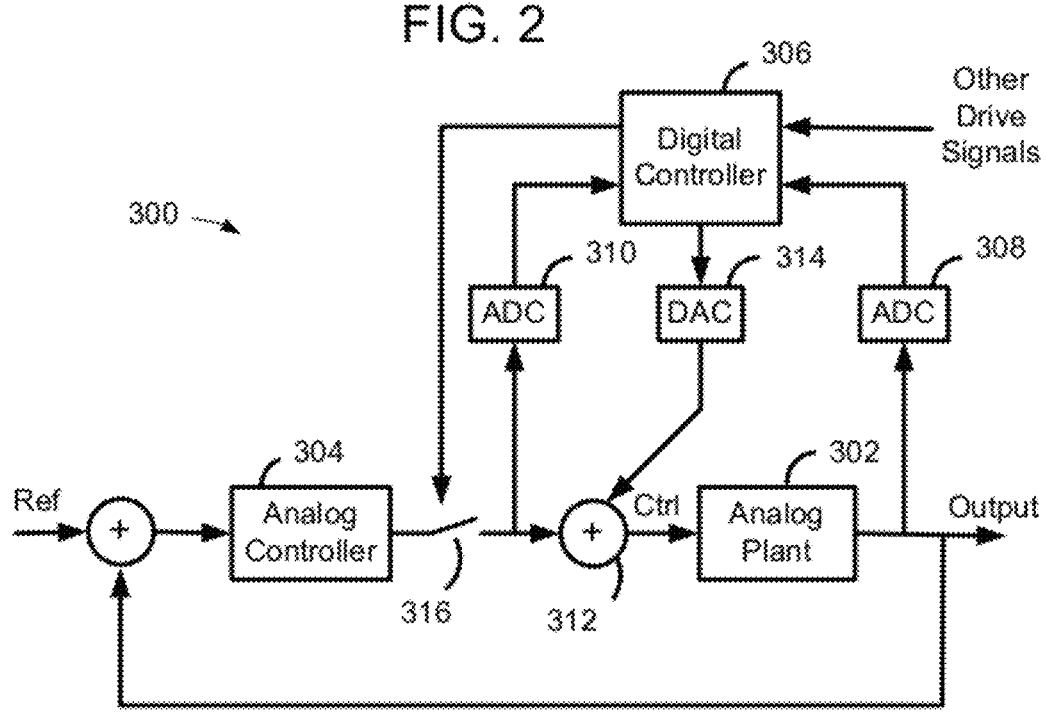
FIG. 3 is a block diagram illustrating an arrangement of components for correcting repeatable runout according to another aspect of the subject matter described herein.

Turning now to FIG. 3, a digitally augmented analog control system 300 is illustrated. The analog plant 302 consists of either the tracking or focus voice control motor (VCM), the optical pick-up unit (OPU) and the respective tracking error signal/focus error signal circuitry. The input control signal to the analog plant 302 is the current to drive the tracking/focus VCM and the output is the respective tracking error signal or focus error signal.

The output of the analog plant 302 is subtracted from a reference signal to produce an analog error signal. The analog error signal is input to the analog controller 304, which produces the control signal to drive the analog plant 302.

The analog controller 304 in an embodiment can be designed to provide specification compliant ("spec-compliant") focus and tracking loops. This involves implementing the analog control specified in the specifications. The analog controller can also be used in some embodiments to handle disturbances for noise sources at frequencies above the Nyquist rate of the digital controller 306.

The digital controller 306 samples both the plant output and the output of the analog controller 304 via ADCs 308, 310 and provides a summing junction 312 so that the digital controller 306 can augment the analog controller 304 via DAC 314. This provides the capability to implement several different control designs in the digital controller 306. For example, a digital integrator with anti-windup limits would be best implemented by sampling the plant output and then injecting the integral of that signal to summing junction 312.

One control design that can be implemented in the control system 300 is repeatable runout (RRO) cancellation. RRO cancellation determines the repeatable error in the tracking/focus loops and generates a cancelling control signal to cancel the RRO error so that the final TES/FES is free of any repeatable components. Techniques that sample the pre-RRO control to estimate the needed cancelling signal can be used. Other techniques that sample the plant output can also be implemented using control system 300. Further details of RRO cancellation is described below.

The control system 300 also includes a switch 316, controlled by the digital controller 306. Opening the switch 316 opens the analog loop and allows the digital controller 306 to completely take over the control under the appropriate conditions (e.g., track jumps, layer hops, or error recovery.) It is understood that while a switch is illustrated, other techniques that remove the analog controller output can be used.

It should be understood that the arrangement of control system 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement control system 300. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

As indicated above, RRO cancellation can be implemented in the control system 300. RRO can be a major problem. The primary source of the RRO is the hole in the disk being mis-centered with respect to the spiral tracks. This mis-centering causes a sinusoidal movement of the tracks at the spin frequency. In addition, if the disk is not perfectly round, this can cause RRO at multiples of the spin frequency.

One form of RRO cancellation is spin speed independent RRO. Disk testers and players often operate in constant linear velocity (CLV) mode. In this mode, the spin speed is constantly changed to maintain a constant linear velocity of the media as the head spirals in or out. This can make it difficult to apply any of the standard RRO cancellation algorithms, which generally assume the RRO is a constant frequency. Using control system 300, the ADC 308 can be sampled at constant angular increments of the spindle rather than constant increments of time. This will warp the sample times such that the RRO will appear to be a constant frequency to the digital controller 306. Conventional RRO cancellation techniques can then be used without modification.

Another form of RRO cancellation is to handle the RRO injection phase and amplitude change as the frequency moves through actuator resonance. Disk testers and disk players must move through a very wide range of spin frequencies as they move from disk outer diameter (OD) to inner diameter (ID) or when speed changes (e.g., from 1× to 4×). These spin frequency and speed changes require that the RRO cancellation operate from well below the resonant frequency of the actuator to well above it. This causes a problem with the RRO cancellation. If any component of the cancellation signal moves from below that resonate frequency to above it, that component must change phase by 180 degrees and at times change amplitude by a factor of several.

If the spin speed changes quickly enough (as can happen when seeking from OD to ID) the RRO cancellation algorithms cannot keep up with the rapid changes which will result in a large off-track error. The digital controller 306 can use the spin speed to change the RRO injection gain and phase "preemptively" as the spin speed changes and then go back to using a conventional RRO tuning algorithm once the spin speed has stabilized at the new speed.

Another form of RRO cancellation is open loop tracking. Many tracking RRO cancellation techniques require that the tracking loop be closed before the RRO cancellation is started. With these techniques, the error in the tracking loop is used to tune the injected control signal needed to cancel the RRO. In some disk testers and players, a miscentered disk can result is a once-around RRO so large that the tracking servo cannot close the servo loop. The tracking servo is also unable to close the loop when spin rate is very high. The digital controller 306 can reconstruct an estimate of the track shape using the track crossings. That reconstructed track shape can be used to tune an injected signal well enough that the analog tracking servo can close. A traditional RRO algorithm can be used to fine tune the control needed to finish cancelling the RRO.

Figure 4:
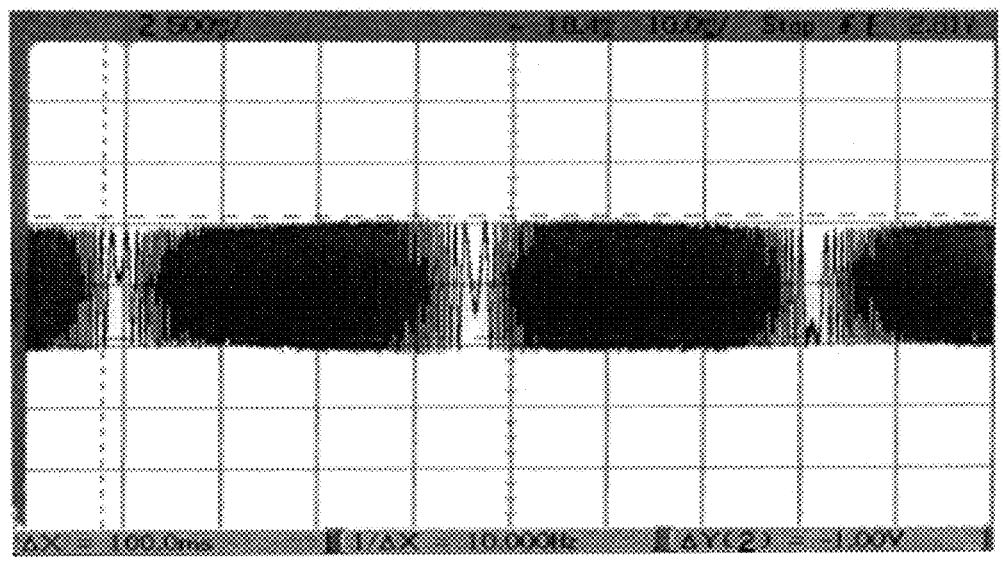
FIG. 4 is an illustration of an open loop tracking signal for a disk with very high RRO.

Turning now to FIG. 4, an open loop tracking signal for a disk with very high RRO (approximately 300 tracks) is shown. The tracking signal goes through one full cycle for each track the OPU crosses. This signal contains the information needed to reconstruct the actual track shape and thus develop a control signal needed to follow this shape. The frequency of this tracking signal is directly related to the velocity of the tracks crossing the OPU and thus the relative velocity between the tracks on the disk and the OPU. The control signal needed to bring this relative velocity to down to a small value, i.e. small enough that the tracking loop can close is "learned."

RRO is composed of harmonics of the spindle rate. The first harmonic is due to mis-centering of the disk center hole and is usually the largest by far. Higher order harmonics can also be present and are due to the tracks on the optical disk being slightly out-of-round. In the description that follows, a method to learn the needed control signal to cancel the first harmonic of the RRO shall be described. It is understood that this method can be used to address higher harmonics.

In an embodiment, the open loop tracking signal is used to reconstruct the relative velocity between the OPU and the optical tracks. By using knowledge of the dynamic transfer function between the tracking actuator control and OPU motion, the control signal necessary to cancel the disk RRO can be found.

Figure 5:
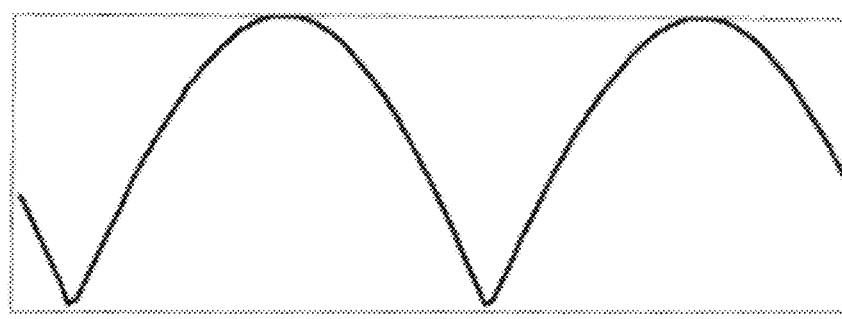
FIG. 5 is an illustration of an example of the frequency of the tracking signal of FIG. 4.

One issue with using the tracking signal shown in FIG. 4 is that it does not provide any direction information. The frequency of the tracking signal essentially provides the absolute value of the velocity between the OPU and the physical tracks on the disk. FIG. 5 illustrates an example of the frequency of the tracking signal from FIG. 4. The frequency shown is for a single revolution of the spindle. It repeats every revolution of the disk.

In order to construct a control signal that will follow the actual track motion, the amplitude and phase of the velocity between the OPU and the track is determined. The amplitude of the velocity can be obtained from FIG. 5. However, there is a 180 degree ambiguity in the phase that must be resolved.

There are several ways to detect the amplitude and phase (to within 180 degrees) from the information shown in FIG. 5. In an embodiment, a computationally efficient discrete Fourier transform (DFT) method is used.

Figure 6:
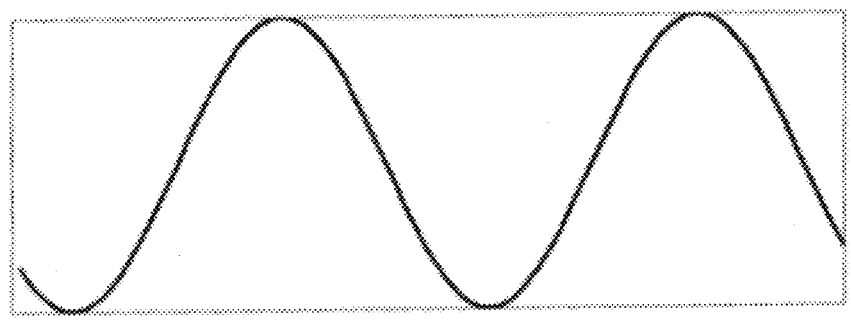
FIG. 6 is an illustration of an example of a squared waveform of the waveform of FIG. 5.

In the DFT method, the signal in FIG. 5 is squared to produce a signal similar to that illustrated in FIG. 6. If the underlying motion is a first harmonic, then the squared signal is a second harmonic plus a DC offset. If the DFT is obtained for the squared signal, the amplitude and phase of the second harmonic can be directly related to the amplitude and phase of the original signal in FIG. 5 to within the 180 degree ambiguity.

Figure 7:
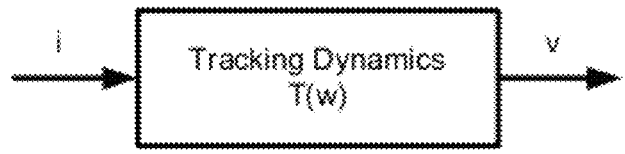
FIG. 7 is a block diagram illustrating a simple model of a tracking actuator transfer function.

FIG. 7 shows a simple model for the tracking actuator. The tracking actuator dynamics are described by the complex transfer function T (w) where w is the frequency of the input control signal. Given a measured output velocity v, the control signal required to cancel that output velocity is:

$$i = T^{-1}(w_0) v \qquad 1$$

There is a 180 degree ambiguity in the velocity signal. To compute the correct control signal, the correct phase of the velocity must be determined. The tracking signal in FIG. 5 can be produced by either of two velocities which are 180 degrees apart. If the wrong phase is chosen and used in equation 1, the result will be to double the relative velocity rather than cancel it.

Figure 8:
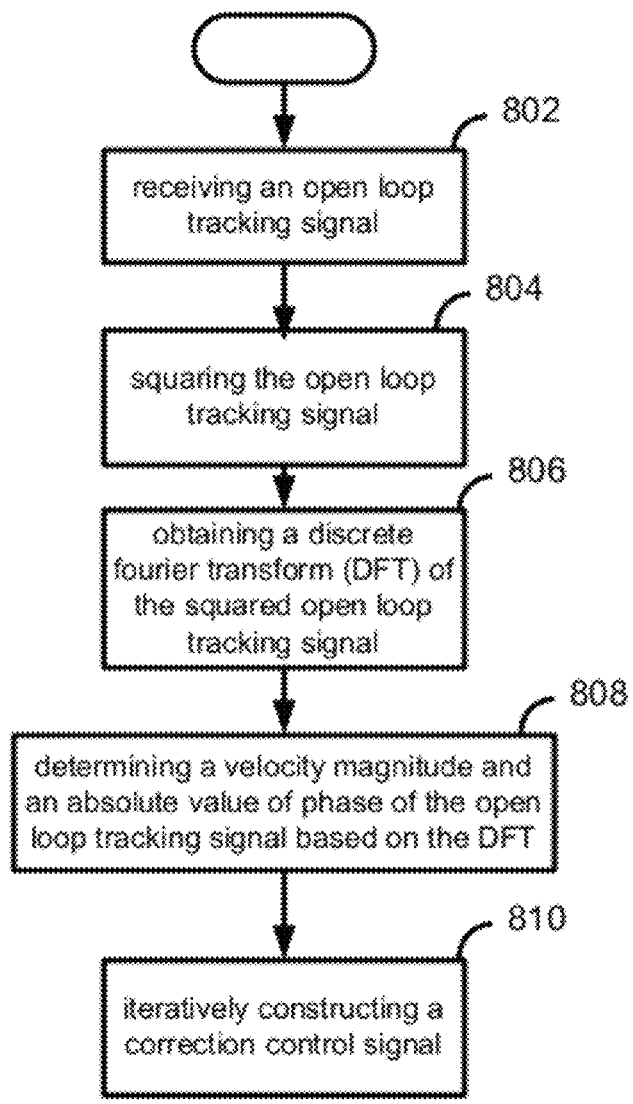
FIG. 8 is a flow diagram illustrating a method for correcting repeatable runout according to an aspect of the subject matter described herein.

Turning now to FIG. 8, a flow diagram is illustrated illustrating a method for correcting repeatable runout according to an exemplary aspect of the subject matter described herein using equation 1. FIG. 3 is a block diagram illustrating an arrangement of components for correcting repeatable runout according to another exemplary aspect of the subject matter described herein. The method in FIG. 8 can be carried out by, for example, some or all of the components illustrated in the exemplary arrangement in FIG. 3

With reference to FIG. 8, in block 802 an open loop tracking signal is received. Accordingly, a system for correcting repeatable runout includes means for receiving an open loop tracking signal. For example, as illustrated in FIG. 3, a digital controller component is configured to receive an open loop tracking signal. In the environment of FIG. 3, the digital controller component 306 can open switch 316 to ensure the tracking signal is an open loop tracking signal.

Returning to FIG. 8, in block 804 the open loop tracking signal is squared. Squaring the signal results in a sinusoidal motion that is computationally more efficient to perform a discrete Fourier transform (DFT). If the underlying motion is a first harmonic, then this signal is a second harmonic plus a DC offset. Accordingly, a system for correcting repeatable runout includes means for squaring the open loop tracking signal. For example, as illustrated in FIG. 3, the digital controller component 306 component is configured to square the open loop tracking signal.

Returning to FIG. 8, in block 806 a DFT of the squared open loop tracking signal is obtained. Accordingly, a system for correcting repeatable runout includes means for obtaining a discrete fourier transform (DFT) of the squared open loop tracking signal. For example, as illustrated in FIG. 3, the digital controller component 306 component is configured to obtain a discrete fourier transform (DFT) of the squared open loop tracking signal.

Returning to FIG. 8, in block 908 a velocity magnitude and an absolute value of phase of the open loop tracking signal based on the DFT is determined. Accordingly, a system for correcting repeatable runout includes means for determining a velocity magnitude and an absolute value of phase of the open loop tracking signal based on the DFT. For example, as illustrated in FIG. 3, the digital controller component 306 is configured to determine a velocity magnitude and an absolute value of phase of the open loop tracking signal based on the DFT.

Returning to FIG. 8, in block 810 a RRO correction control signal is iteratively constructed. Accordingly, a system for correcting repeatable runout includes means for iteratively constructing a RRO correction control signal by. For example, as illustrated in FIG. 3, the digital controller component 306 component is configured to iteratively construct a RRO correction control signal by performing the steps of blocks 900-912.

Figure 9:
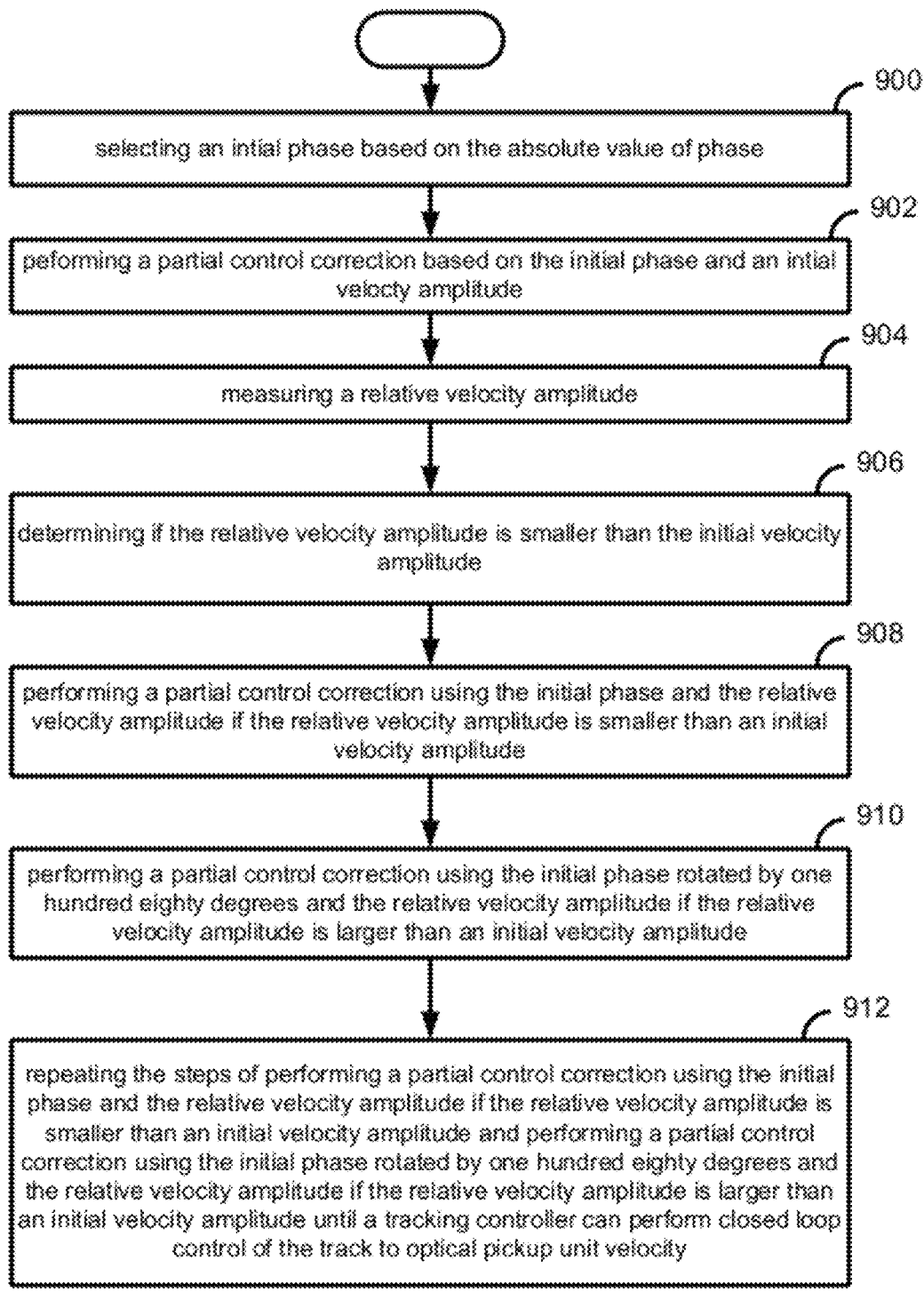
FIG. 9 is a block diagram illustrating a method for iteratively constructing an RRO correction signal.

Turning now to FIG. 9, an embodiment of iteratively constructing a RRO correction signal is illustrated. In block 900 an initial phase based on the absolute value of phase is selected. In an embodiment, one of the two possible phases is picked at random. Accordingly, a system for correcting repeatable runout includes means for selecting an initial phase based on the absolute value of phase. For example, as illustrated in FIG. 3, the digital controller component 306 component is configured to select an initial phase based on the absolute value of phase.

Returning to FIG. 9, in block 902 a partial control correction based on the initial phase and an initial velocity amplitude is performed. Accordingly, a system for correcting repeatable runout includes means for performing a partial control correction based on the initial phase and an initial velocity amplitude. For example, as illustrated in FIG. 3, the digital controller component 306 component is configured to perform a partial control correction based on the initial phase and an initial velocity amplitude.

A partial control correction can be computed as $$i^* = \lambda T^{-1}(w_0) v \qquad 2$$

where $\lambda$ is less than 1, T is a transfer function of a tracking actuation, w is the frequency of the input control signal, v is measured output velocity, and i is the control signal required to cancel that output velocity. The partial control correction will result in a control signal that would reduce the relative velocity if the correct phase is chosen and increase the relative velocity if the incorrect phase is chosen.

Returning to FIG. 9, in block 904 a relative velocity amplitude is measured. Accordingly, a system for correcting repeatable runout includes means for measuring a relative velocity amplitude. For example, as illustrated in FIG. 3, the digital controller component 306 component is configured for measuring a relative velocity amplitude.

Returning to FIG. 9, in block 906 a determination is made if the relative velocity amplitude is smaller than the initial velocity amplitude. Accordingly, a system for correcting repeatable runout includes means for determining if the relative velocity amplitude is smaller than the initial velocity amplitude. For example, as illustrated in FIG. 3, the digital controller component 306 component is configured to determine if the relative velocity amplitude is smaller than the initial velocity amplitude. If the relative velocity amplitude is less than the initial velocity amplitude, then the chosen phase was correct and i* is maintained.

Returning to FIG. 9, in block 908 a partial control correction is performed using the initial phase and the relative velocity amplitude if the relative velocity amplitude is smaller than an initial velocity amplitude. Accordingly, a system for correcting repeatable runout includes means for performing a partial control correction using the initial phase and the relative velocity amplitude if the relative velocity amplitude is smaller than an initial velocity amplitude. For example, as illustrated in FIG. 3, the digital controller component 306 component is configured to perform a partial control correction using the initial phase and the relative velocity amplitude if the relative velocity amplitude is smaller than an initial velocity amplitude.

Returning to FIG. 9, in block 910 a partial control correction is performed using the initial phase rotated by one hundred eighty degrees and the relative velocity amplitude if the relative velocity amplitude is larger than an initial velocity amplitude. Accordingly, a system for correcting repeatable runout includes means for performing a partial control correction using the initial phase rotated by one hundred eighty degrees and the relative velocity amplitude if the relative velocity amplitude is larger than an initial velocity amplitude. For example, as illustrated in FIG. 3, the digital controller component 306 component is configured for performing a partial control correction using the initial phase rotated by one hundred eighty degrees and the relative velocity amplitude if the relative velocity amplitude is larger than an initial velocity amplitude.

Call the new lower relative velocity $v_1$ and the control used $i_1$. Then the procedure is repeated. A new partial correction is computed using the residual velocity $v_1$:

$$i^* = \lambda T^{-1}(w_0) v_1 \qquad 3$$

This new partial control correction is added to the existing control $i_1$ and the relative velocity is measured. If the measured relative velocity v* is smaller than $v_1$, then the phase of the correction is correct. Otherwise the partial correction is rotated by 180 degrees and the relative velocity is checked again. One of these corrections will reduce the velocity. Call the new relative velocity $v_2$ and the additional control $i_2$. Then the new RRO correction control signal is $$i = i_1 + i_2 \qquad 4$$

Returning to FIG. 9, in block 912 the steps of performing a partial control correction using the initial phase and the relative velocity amplitude if the relative velocity amplitude is smaller than an initial velocity amplitude and performing a partial control correction using the initial phase rotated by one hundred eighty degrees and the relative velocity amplitude if the relative velocity amplitude is larger than an initial velocity amplitude is repeated until a tracking controller can perform closed loop control of the track to optical pickup unit velocity. Accordingly, a system for correcting repeatable runout includes means for repeating the steps of performing a partial control correction using the initial phase and the relative velocity amplitude if the relative velocity amplitude is smaller than an initial velocity amplitude and performing a partial control correction using the initial phase rotated by one hundred eighty degrees and the relative velocity amplitude if the relative velocity amplitude is larger than an initial velocity amplitude until a tracking controller can perform closed loop control of the track to optical pickup unit velocity. For example, as illustrated in FIG. 3, the digital controller component 306 component is configured for repeating the steps of performing a partial control correction using the initial phase and the relative velocity amplitude if the relative velocity amplitude is smaller than an initial velocity amplitude and performing a partial control correction using the initial phase rotated by one hundred eighty degrees and the relative velocity amplitude if the relative velocity amplitude is larger than an initial velocity amplitude until a tracking controller can perform closed loop control of the track to optical pickup unit velocity.

Once the loop has been closed, conventional RRO cancellation techniques can be used. The RRO correction control signal is the sum of the partial control corrections. For example, if n partial control corrections are performed, the RRO correction control signal is $$i = i_1 + i_2 + \ldots + i_n = \Sigma_1^n i_n \qquad 5$$

The RRO correction control signal is added to the conventional RRO cancellation techniques by adding the RRO correction signal to the control signal via DAC 314 and summing junction 312.

In the preceding description, the first order harmonics were canceled using the iteratively constructed cancellation signal. It is noted that the preceding steps can be used to cancel higher order RRO harmonics.

As indicated above, the RRO correction signal should handle the RRO injection phase and amplitude change as the frequency moves through actuator resonance. For example, the resonant frequency of optical OP U's is very low (e.g., on the order of 40 to 60 Hz). The standard method of performing this calibration is injecting a sinusoidal disturbance between the analog controller and plant and measuring the loop's response. This method works very poorly at such low frequencies. Additionally, Optical disk testers and players must move through a very wide range of spin frequencies as they move from OD to ID or change speeds (e.g., from 1× to 4×). These changes require that the RRO operate from well below the resonant frequency of the actuator to well above it. If any component of the cancellation signal moves from below that resonate frequency to above it, that component must change phase by 180 degrees and at times change amplitude by a factor of several. If the spin speed changes quickly enough (as can happen when seeking from OD to ID) the RRO tuning techniques cannot keep up with the rapid changes which result in a large off track error.

Figure 10:
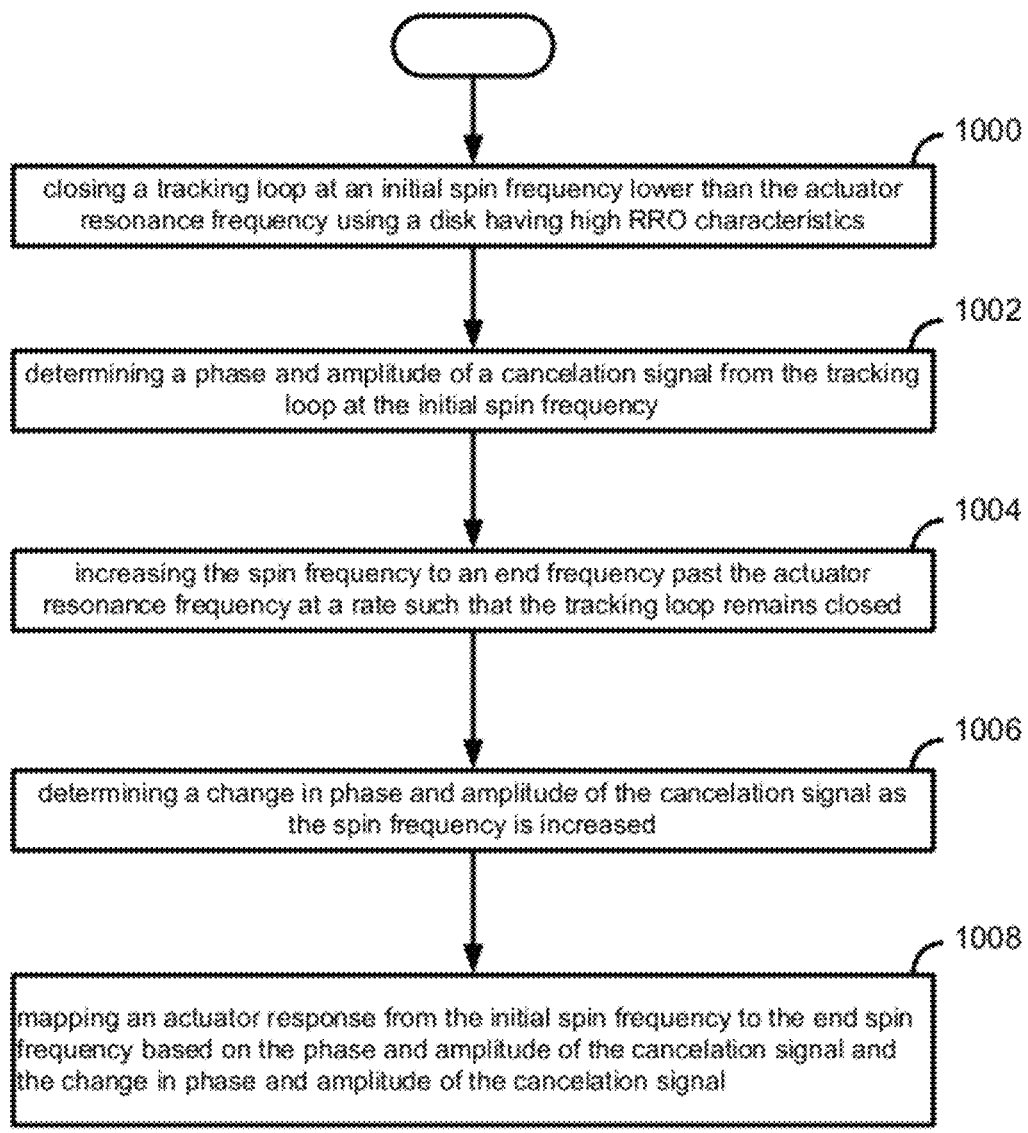
FIG. 10 is a flow diagram illustrating a method for correcting repeatable runout as spin frequency moves through actuator resonance frequency of a device according to another aspect of the subject matter described herein.

Turning now to FIG. 10, a flow diagram is illustrated illustrating a method for correcting repeatable runout as spin frequency moves through actuator resonance frequency of a device according to an exemplary aspect of the subject matter described herein. The actuator resonance frequency can be measured or calculated. FIG. 3 is a block diagram illustrating a system for correcting repeatable runout as spin frequency moves through actuator resonance frequency of a device according to another exemplary aspect of the subject matter described herein. The method in FIG. 10 can be carried out by, for example, some or all of the components illustrated in the exemplary arrangement in FIG. 3 operating in a compatible execution environment.

With reference to FIG. 10, in block 1000 a tracking loop is closed at an initial spin frequency lower than the actuator resonance frequency using a disk having high RRO characteristics. For example, if the system is loaded with an optical disk known to have a mis-centered center hole, this will generate a high RRO signal at the spin frequency. Accordingly, a system for correcting repeatable runout as spin frequency moves through actuator resonace frequency of a device includes means for closing a tracking loop at an initial spin frequency lower than the actuator resonance frequency using a disk having high RRO characteristics. For example, as illustrated in FIG. 3, an analog controller component 304 is configured to close a tracking loop at an initial spin frequency lower than the actuator resonance frequency using a disk having high RRO characteristics.

Returning to FIG. 10, in block 1002 a phase and amplitude of a cancelation signal is determined from the tracking loop at the initial spin frequency The determination is made once the tracking loop has tuned itself to the RRO of the disk. Accordingly, a system for correcting repeatable runout as spin frequency moves through actuator resonace frequency of a device includes means for determining a phase and amplitude of a cancelation signal from the tracking loop at the initial spin frequency. For example, as illustrated in FIG. 3, a digital controller component 306 is configured to determine a phase and amplitude of a cancelation signal from the tracking loop at the initial spin frequency.

Returning to FIG. 10, in block 1004 the spin frequency is increased to an end frequency past the actuator resonance frequency at a rate such that the tracking loop remains closed. Thus, the tracking loop can tune itself over the frequency range. Accordingly, a system for correcting repeatable runout as spin frequency moves through actuator resonace frequency of a device includes means for increasing the spin frequency to an end frequency past the actuator resonance frequency at a rate such that the tracking loop remains closed. For example, as illustrated in FIG. 3, the analog controller component 304 is configured to increase the spin frequency to an end frequency past the actuator resonance frequency at a rate such that the tracking loop remains closed.

Returning to FIG. 10, in block 1006 a change in phase and amplitude of the cancelation signal is determined as the spin frequency is increased. Accordingly, a system for correcting repeatable runout as spin frequency moves through actuator resonace frequency of a device includes means for determining a change in phase and amplitude of the cancelation signal as the spin frequency is increased. For example, as illustrated in FIG. 3, the digital controller component 306 is configured to determine a change in phase and amplitude of the cancelation signal as the spin frequency is increased.

Returning to FIG. 10, in block 1008 an actuator response is mapped from the initial spin frequency to the end spin frequency based on the phase and amplitude of the cancelation signal and the change in phase and amplitude of the cancelation signal. Accordingly, a system for correcting repeatable runout as spin frequency moves through actuator resonace frequency of a device includes means for mapping an actuator response from the initial spin frequency to the end spin frequency based on the phase and amplitude of the cancelation signal and the change in phase and amplitude of the cancelation signal. For example, as illustrated in FIG. 3, the digital controller component 306 is configured to map an actuator response from the initial spin frequency to the end spin frequency based on the phase and amplitude of the cancelation signal and the change in phase and amplitude of the cancelation signal. The mapping can be stored.

The change in phase and amplitude of the cancellation signal maps out the actuator response over the range that the spin frequency was varied. The change is the phase and amplitude correction that is required to handle the RRO injection phase and amplitude change as the frequency moves through actuator resonance during normal operation. Thus, the gain and phase of the RRO cancellation signal can be changed based on the mapping during operation. For example, digital controller component 306 can use the spin speed to change the RRO injection gain and phase "preemptively" as the spin speed changes and then go back to using a standard RRO tuning technique once the spin speed has stabilized at a new speed.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. One of ordinary skill in the art should appreciate after learning the teachings related to the claimed subject matter contained in the foregoing description that variations of those preferred embodiments may become apparent to those of ordinary skill in the art upon reading the foregoing description. The inventor intends that the claimed subject matter may be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for correcting repeatable runout (RRO), the method comprising:
   receiving an open loop tracking signal;
   squaring the open loop tracking signal;
   obtaining a discrete Fourier transform (DFT) of the squared open loop tracking signal;
   determining a velocity magnitude and an absolute value of phase of the open loop tracking signal based on the DFT; and
   iteratively constructing a RRO correction control signal by:
      selecting an initial phase based on the absolute value of phase;
      performing a partial control correction based on the initial phase and an initial velocity amplitude;
      measuring a relative velocity amplitude;
      determining if the relative velocity amplitude is smaller than the initial velocity amplitude;
      performing a partial control correction using the initial phase and the relative velocity amplitude if the relative velocity amplitude is smaller than an initial velocity amplitude;
      performing a partial control correction using the initial phase rotated by one hundred eighty degrees and the relative velocity amplitude if the relative velocity amplitude is larger than an initial velocity amplitude; and
      repeating the steps of performing a partial control correction using the initial phase and the relative velocity amplitude if the relative velocity amplitude is smaller than an initial velocity amplitude and performing a partial control correction using the initial phase rotated by one hundred eighty degrees and the relative velocity amplitude if the relative velocity amplitude is larger than an initial velocity amplitude until a tracking controller can perform closed loop control of the track to optical pickup unit velocity,
   wherein at least one of the preceding actions is performed on at least one electronic hardware component.

2. The method of claim 1 further comprising opening an analog control loop.

3. The method of claim 1 wherein the partial control correction is performed in accordance with $$i^* = \lambda T^{-1}(w_0) v$$

where $\lambda$ is less than 1, w is a frequency, T is a transfer function of a tracking actuator, v is a velocity amplitude, and i is a control signal.

4. The method of claim 1 further comprising adding the partial control correction to the RRO correction control signal if the relative velocity amplitude is smaller than the initial velocity amplitude.

5. The method of claim 4 further comprising adding the RRO correction control signal to a control signal.

6. The method of claim 1 further comprising repeating the steps of iteratively constructing the RRO correction control signal for a plurality of harmonic frequencies.

7. A method for correcting repeatable runout (RRO) as spin frequency moves through actuator resonance frequency of a device, the method comprising:
   closing a tracking loop at an initial spin frequency lower than the actuator resonance frequency using a disk having high RRO characteristics;
   determining a phase and amplitude of a cancelation signal from the tracking loop at the initial spin frequency;
   increasing the spin frequency to an end frequency past the actuator resonance frequency at a rate such that the tracking loop remains closed;
   determining a change in phase and amplitude of the cancelation signal as the spin frequency is increased; and
   mapping an actuator response from the initial spin frequency to the end spin frequency based on the phase and amplitude of the cancelation signal and the change in phase and amplitude of the cancelation signal,
   wherein at least one of the preceding actions is performed on at least one electronic hardware component.

8. The method of claim 7 further comprising determining the actuator resonance frequency.

9. The method of claim 7 further comprising storing the mapping.

10. The method of claim 7 further comprising changing a gain and phase based on the mapping during operation of the device.

11. A system for correcting repeatable runout (RRO), the system comprising:
means for receiving an open loop tracking signal;
means for squaring the open loop tracking signal;
means for obtaining a discrete fourier transform (DFT) of the squared open loop tracking signal;
means for determining a velocity magnitude and an absolute value of phase of the open loop tracking signal based on the DFT;
means for iteratively constructing a RRO correction control signal by:
means for selecting an initial phase based on the absolute value of phase;
means for performing a partial control correction based on the initial phase and an initial velocity amplitude;
means for measuring a relative velocity amplitude;
means for determining if the relative velocity amplitude is smaller than the initial velocity amplitude;
means for performing a partical control correction using the initial phase and the relative velocity amplitude if the relative velocity amplitude is smaller than an initial velocity amplitude;
means for performing a partical control correction using the initial phase rotated by one hundred eighty degrees and the relative velocity amplitude if the relative velocity amplitude is larger than an initial velocity amplitude; and
means for repeating the steps of performing a partical control correction using the initial phase and the relative velocity amplitude if the relative velocity amplitude is smaller than an initial velocity amplitude and performing a partical control correction using the initial phase rotated by one hundred eighty degrees and the relative velocity amplitude if the relative velocity amplitude is larger than an initial velocity amplitude until a tracking controller can perform closed loop control of the track to optical pickup unit velocity,
wherein at least one of the means includes at least one electronic hardware component.

12. A system for correcting repeatable runout (RRO), the system comprising a digital controller component switchably controlling an analog controller output, the system comprising:
a digital controller component configured for:
receiving an open loop tracking signal;
squaring the open loop tracking signal;
obtaining a discrete fourier transform (DFT) of the squared open loop tracking signal;
determining a velocity magnitude and an absolute value of phase of the open loop tracking signal based on the DFT;
iteratively constructing a RRO correction control signal by:
selecting an initial phase based on the absolute value of phase;
performing a partial control correction based on the initial phase and an initial velocity amplitude;
measuring a relative velocity amplitude;
determining if the relative velocity amplitude is smaller than the initial velocity amplitude;
performing a partical control correction using the initial phase and the relative velocity amplitude if the relative velocity amplitude is smaller than an initial velocity amplitude;
performing a partical control correction using the initial phase rotated by one hundred eighty degrees and the relative velocity amplitude if the relative velocity amplitude is larger than an initial velocity amplitude; and
repeating the steps of performing a partical control correction using the initial phase and the relative velocity amplitude if the relative velocity amplitude is smaller than an initial velocity amplitude and performing a partical control correction using the initial phase rotated by one hundred eighty degrees and the relative velocity amplitude if the relative velocity amplitude is larger than an initial velocity amplitude until a tracking controller can perform closed loop control of the track to optical pickup unit velocity,
wherein at least one of the system components includes at least one electronic hardware component.

13. The system of claim 12 further comprising switching, by the digital controller, an analog controller output open.

14. The system of claim 12 wherein the digital controller component is configured for performing the partial control correction in accordance with $$i^* = \lambda T^{-1}(w_0) v$$

where $\lambda$ is less than 1, w is a frequency, T is a transfer function of a tracking actuator, v is a velocity amplitude, and i is a control signal.

15. The system of claim 12 further comprising adding, by the digital controller, the partial control correction to the RRO correction control signal if the relative velocity amplitude is smaller than the initial velocity amplitude.

16. The system of claim 15 further comprising adding the RRO correction control signal to a control signal.

17. The system of claim 12 further comprising repeating the steps of iteratively constructing the RRO correction control signal for a plurality of harmonic frequencies.

18. A system for correcting repeatable runout (RRO) as spin frequency moves through actuator resonace frequency of a device, the system comprising:
means for closing a tracking loop at an initial spin frequency lower than the actuator resonance frequency using a disk having high RRO characteristics;
means for determining a phase and amplitude of a cancelation signal from the tracking loop at the initial spin frequency;
means for increasing the spin frequency to an end frequency past the actuator resonance frequency at a rate such that the tracking loop remains closed;
means for determining a change in phase and amplitude of the cancelation signal as the spin frequency is increased; and
means for mapping an actuator response from the initial spin frequency to the end spin frequency based on the phase and amplitude of the cancelation signal and the change in phase and amplitude of the cancelation signal,
wherein at least one of the means includes at least one electronic hardware component.

19. A system for correcting repeatable runout as spin frequency moves through actuator resonace frequency of a device, the system comprising system components including:

an analog controller component configured for closing a tracking loop at an initial spin frequency lower than the actuator resonance frequency using a disk having high RRO characteristics;

a digital controller component configured for determining a phase and amplitude of a cancelation signal from the tracking loop at the initial spin frequency;

the analog controller component configured for increasing the spin frequency to an end frequency past the actuator resonance frequency at a rate such that the tracking loop remains closed;

the digital controller component configured for determining a change in phase and amplitude of the cancelation signal as the spin frequency is increased; and the digital controller component configured for mapping an actuator response from the initial spin frequency to the end spin frequency based on the phase and amplitude of the cancelation signal and the change in phase and amplitude of the cancelation signal, wherein at least one of the system components includes at least one electronic hardware component.

20. The system of claim 19 further comprising determining the actuator resonance frequency.

21. The system of claim 19 further comprising storing the mapping.

22. The system of claim 19 further comprising changing a gain and phase based on the mapping during operation of the device.

23. A non-transitory computer readable medium storing a computer program, executable by a machine, for correcting repeatable runout (RRO), the computer program comprising executable instructions for:

receiving an open loop tracking signal;

squaring the open loop tracking signal;

obtaining a discrete fourier transform (DFT) of the squared open loop tracking signal;

determining a velocity magnitude and an absolute value of phase of the open loop tracking signal based on the DFT;

iteratively constructing a RRO correction control signal by:

selecting an initial phase based on the absolute value of phase;

performing a partial control correction based on the initial phase and an initial velocity amplitude;

measuring a relative velocity amplitude;

determining if the relative velocity amplitude is smaller than the initial velocity amplitude;

performing a partical control correction using the initial phase and the relative velocity amplitude if the relative velocity amplitude is smaller than an initial velocity amplitude;

performing a partical control correction using the initial phase rotated by one hundred eighty degrees and the relative velocity amplitude if the relative velocity amplitude is larger than an initial velocity amplitude; and repeating the steps of performing a partical control correction using the initial phase and the relative velocity amplitude if the relative velocity amplitude is smaller than an initial velocity amplitude and performing a partical control correction using the initial phase rotated by one hundred eighty degrees and the relative velocity amplitude if the relative velocity amplitude is larger than an initial velocity amplitude until a tracking controller can perform closed loop control of the track to optical pickup unit velocity.

24. A non-transitory computer readable medium storing a computer program, executable by a machine, for correcting repeatable runout (RRO) as spin frequency moves through actuator resonace frequency of a device, the computer program comprising executable instructions for:

closing a tracking loop at an initial spin frequency lower than the actuator resonance frequency using a disk having high RRO characteristics;

determining a phase and amplitude of a cancelation signal from the tracking loop at the initial spin frequency;

increasing the spin frequency to an end frequency past the actuator resonance frequency at a rate such that the tracking loop remains closed;

determining a change in phase and amplitude of the cancelation signal as the spin frequency is increased; and mapping an actuator response from the initial spin frequency to the end spin frequency based on the phase and amplitude of the cancelation signal and the change in phase and amplitude of the cancelation signal.

* * * * *